April 9, 1940.　　　D. VON MIHÁLY　　　2,196,348
ENDLESS SOUND FILM APPARATUS
Filed Feb. 14, 1938
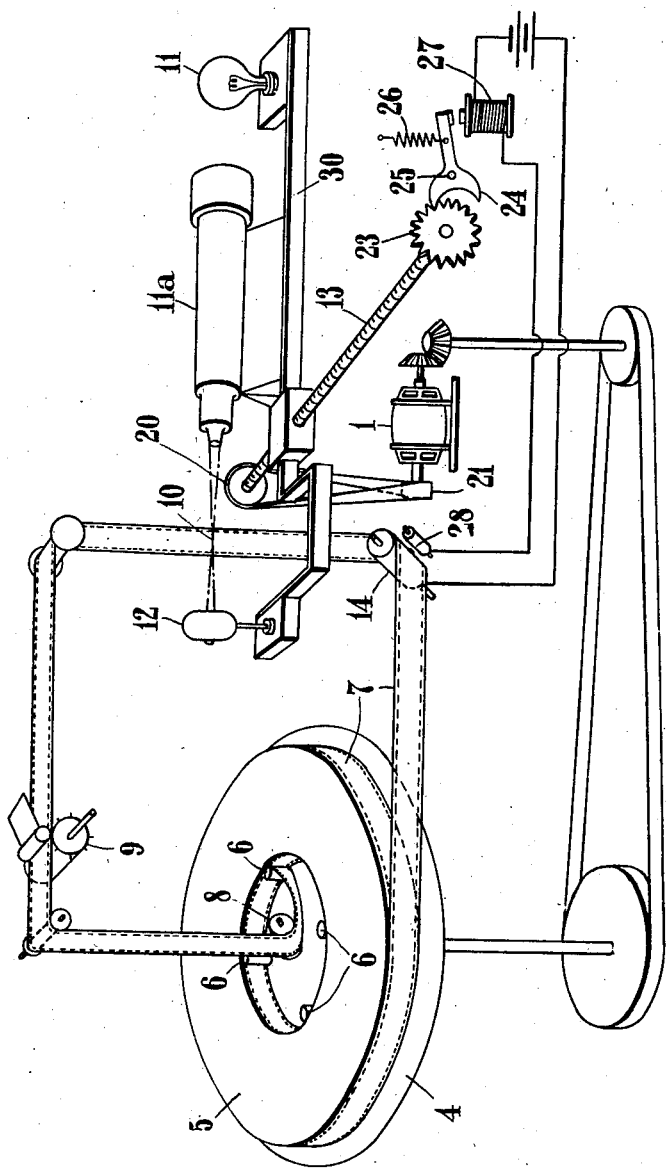
Inventor,
D. von Mihály
by Glascock Downing Seebold
Attys.

Patented Apr. 9, 1940

2,196,348

UNITED STATES PATENT OFFICE 2,196,348

ENDLESS SOUND FILM APPARATUS

Dénes von Mihály, Berlin-Wilmersdorf, Germany

Application February 14, 1938, Serial No. 190,522
In Germany December 8, 1928

4 Claims. (Cl. 274—5)

The present invention, which is a continuation in part of my application Serial No. 350,692, filed March 28, 1929, now Patent No. 2,123,323 of July 12, 1938, relates to apparatus for recording sound upon endless bands of film, or for reproducing sound from such films, or for both recording and reproducing sound on such films. More particularly the invention relates to film apparatus in which films are employed which bear a plurality of sound tracks side by side, and in which the sound tracks run parallel to one another and to the edge of the film, successive turns of the sound track being connected with one another by inclined transition elements.

With the present invention, therefore, the ray of light that controls the sound must be displaced transversely to the direction of movement of the film at certain positions. The power serving to displace the ray of light that controls the sound is according to this invention obtained from the motor that drives the film at the sound controlling position, and that preferably also drives the film spool. The transmission of the power from the motor to the optical system for the ray of light that controls the sound is preferably effected by the aid of a slipping clutch, which may serve for instance to drive a screw spindle.

One embodiment of the invention as illustrated by way of example in the accompanying drawing, which is a diagrammatic perspective view of the recording or reproducing apparatus as a whole.

In this drawing the film is denoted by 7. This film is wound into a spool 5, which is supported upon a spool plate or turn-table 4. In the apparatus according to the invention the film is drawn out by one or more toothed or spiked cylinders 9 from the interior of the spool, over vertical rollers 6 and a preferably inclined roller 8, and runs from there over various guide pulleys to the sound controlling position 10, and then from the latter back to the film spool. 14 is a roller which serves to feed the film to the film spool in a convenient manner. The spool plate or turn-table 4 may be driven by the motor 1, as indicated in the drawing.

The optical sound recording or reproducing means is represented in the example illustrated as a reproducer consisting of a lamp 11, a microscopic optical system 11a, and a photo-electric cell 12. All the parts of these devices are arranged in the embodiment illustrated by way of example upon a common carrier 30. This carrier 30, as will be evident from the drawing, is connected with a screw spindle 13, which has at one end a wheel 23 somewhat resembling a toothed gear wheel, in the teeth of which there engages a detent 24, which is pivoted at 25. The detent 24 is pulled in one direction by a spring 26, and in the other direction by a magnet 27. By means of a belt pulley 21 the motor 1 drives a slipping clutch 20, which is connected with the screw spindle 13.

This apparatus operates in the following manner: So long as the detent 24 engages the toothed wheel 23, the screw spindle 13 cannot move, so the sound controlling ray of light is stationary. Now when the magnet 27 is energized, which may be effected by means of a mark applied to the film and by means of a contact roller 28, which engages this mark, the detent 24 will release the toothed wheel 23 for a moment, and the screw spindle will be moved by the slipping clutch 20. During this movement the sound controlling ray of light travels a short distance transversely to the direction in which the film is running, thus passing from one turn of the sound record to the next.

What I claim is:

1. Sound film apparatus for endless films with a plurality of sound record lines side by side, parallel to the edges of the film as well as to one another, successive lines being connected with one another by short inclined record line elements, comprising optical means that serve for producing a sound controlling ray of light, a driving motor for advancing the film, and means for transmitting the power of the driving motor to the said optical means to displace the said optical means transversely to the direction of running of the film at a speed having a constant ratio to the speed of running of the film.

2. Sound film apparatus for endless films with a plurality of sound record lines side by side, parallel to the edges of the film as well as to one another, successive lines being connected with one another by short inclined record line elements, comprising optical means that serve for producing a sound controlling ray of light, a driving motor for advancing the film, and means for transmitting the power of the driving motor to the said optical means to displace the said optical means transversely to the direction of running of the film at a speed having a constant ratio to the speed of running of the film, markings provided on the said endless film, locking means provided on the said power transmission means between the motor and the optical means, to prevent the action of the power upon the said optical means so long as the marking on the film is not acting upon the said locking means.

3. Sound film apparatus for endless films with a plurality of sound record lines side by side, parallel to the edges of the film as well as to one another, successive lines being connected with one another by short inclined record line elements, comprising optical means that serve for producing a sound controlling ray of light, a driving motor for advancing the film, and means for transmitting the power of the driving motor to the said optical means to displace the said optical means transversely to the direction of running of the film at a speed having a constant ratio to the speed of running of the film, markings provided on the endless film, locking means provided on the said power transmission means between the motor and the optical means, the said locking means preventing the action of the power upon the said optical means so long as the marking on the film is not acting upon the said locking means, the said power transmission means consisting of a slipping clutch.

4. A sound film apparatus for endless films with a plurality of sound record lines side by side, parallel to the edges of the film as well as to one another, successive lines being connected with one another by short inclined record line elements, comprising optical means that serve for producing a sound controlling ray of light, a driving motor for advancing the film, means for transmitting the power of the driving motor to the said optical means to displace the said optical means transversely to the direction of running of the film at a speed having a constant ratio to the speed of running of the film, markings provided on the endless film, locking means provided on the said power transmission means between the motor and the optical means, the said locking means preventing the action of the power upon the said optical means so long as the marking on the film is not acting upon the said locking means, and a screw spindle connected with the optical means, the said power transmission means consisting of a slipping clutch acting upon the said screw spindle.

DÉNES VON MIHÁLY.